United States Patent [19]

Gyoda

[11] Patent Number: 4,462,554
[45] Date of Patent: Jul. 31, 1984

[54] WEBBING LOCK DEVICE

[75] Inventor: Toshio Gyoda, Nagoya, Japan

[73] Assignee: Kabushiki Kaisha Tokai Rika Denki Seisakusho, Aichi, Japan

[21] Appl. No.: 325,866

[22] Filed: Nov. 30, 1981

[30] Foreign Application Priority Data

Dec. 3, 1980 [JP] Japan .......................... 55-173618[U]

[51] Int. Cl.$^3$ ............................................. A62B 35/02
[52] U.S. Cl. ................................ 242/107.2; 188/65.1
[58] Field of Search .................... 242/107.2; 280/806, 280/808; 297/478, 479, 480; 188/65.1, 65.4; 24/DIG. 22

[56] References Cited

U.S. PATENT DOCUMENTS

| 3,494,571 | 2/1970 | Stoffel | 242/107.2 |
| 4,181,273 | 1/1980 | Adomeit | 242/107.2 |
| 4,278,215 | 7/1981 | Nakaho | 242/107.2 |
| 4,286,759 | 9/1981 | Usami et al. | 242/107.2 |
| 4,319,667 | 3/1982 | Motonami et al. | 188/65.1 |
| 4,371,126 | 2/1983 | Tsuge et al. | 242/107.2 |

Primary Examiner—Stuart S. Levy
Assistant Examiner—Lloyd D. Doigan
Attorney, Agent, or Firm—Parkhurst & Oliff

[57] ABSTRACT

A webbing lock device in which an occupant restraining webbing extending from a takeup shaft of a retractor is clamped between a pair of clamping members by closing an interval therebetween, when an abrupt tensile force acts on the webbing as in the event of an emergency situation. Each of the clamping members has a corrugated surface on opposed side thereof and concave portions of one of the corrugated surfaces are disposed to correspond to convex portions of the other of the corrugated surfaces. An interval between the corrugated surfaces progressively decreases toward the takeup shaft along the longitudinal direction of the webbing, and the radius of the curvature of the corrugated surfaces, for example, is progressively smaller toward the takeup shaft, whereby clamping force to the webbing between the corrugated surfaces progressively increases toward the takeup shaft along the longitudinal direction of the webbing and there is no point where tensile force acting on the webbing abruptly decreases or increases to break the webbing.

11 Claims, 5 Drawing Figures

WEBBING LOCK DEVICE

BACKGROUND OF THE INVENTION

1. Field of the Invention

This invention relates to a webbing lock device for locking as necessary an occupant restraining webbing used in a seatbelt system for protecting an occupant in the event of an emergency situation, and particularly to a webbing lock device wherein an intermediate portion of the webbing is directly clamped for locking.

2. Description of the Prior Art

In the webbing retractors commonly used in seatbelt systems, even after the webbing winding rotation of a takeup shaft of a retractor has been locked, a considerable length of the webbing is unwound from the retractor until the webbing is tightly wound around the takeup shaft in layers since the webbing is usually relatively wound around the takeup shaft in a non-tight condition. Because of this, there has been proposed a webbing lock device in which an intermediate portion of the webbing is directly clamped by utilization of a tensile force of the webbing when the tensile force increases in value.

The abovementioned webbing lock device is adapted to clamp the intermediate portion of the webbing by means of a pair of corrugated surfaces. These corrugated surfaces are caused to close the interval therebetween to clamp the webbing where the interval therebetween at the side of the occupant restraining portion is wider than that at the side of the takeup shaft, whereby the tensile force of the webbing progressively decreases from the side of the occupant restraining portion to the side of the takeup shaft.

However, with the conventional webbing lock device of the type described, a pair of corrugated surfaces each having a predetermined curvature are merely inclined, whereby the interval between the opposing corrugated surfaces discontinuously varies, so that there exists a portion where the interval partially decreases. Consequently, in this webbing clamping portion where the interval partially increases, so that the webbing is not effectively clamped between the entire corrugated surfaces.

SUMMARY OF THE INVENTION

The present invention is developed in view of the abovedescribed facts and has as its object the provision of a webbing lock device in which there exists no portion along the corrugated surfaces where clamping force to the webbing abruptly decreases or increases.

To achieve the above object, the present invention provides a unique improvement for the webbing lock device, wherein an occupant restraining webbing extending from a takeup shaft of a retractor used in a seatbelt system is clamped between a pair of clamping members. Each of the clamping members has a corrugated surface on opposed side thereof and an interval between the corrugated surfaces progressively and continuously increases from one end of the corrugated surfaces adjacent the takeup shaft toward the other end of the corrugated surfaces adjacent an occupant, along the longitudinal direction of the webbing. Radius of curvature of the corrugated surface, as an example, progressively and continuously increases from one end of the corrugated surfaces adjacent the takeup shaft toward the other side of the corrugated surfaces adjacent an occupant, along the longitudinal direction of the webbing.

DESCRIPTION OF THE PREFERRED EMBODIMENT

Description will hereunder be given of an embodiment of the present invention with reference to the drawings.

Figure 1:
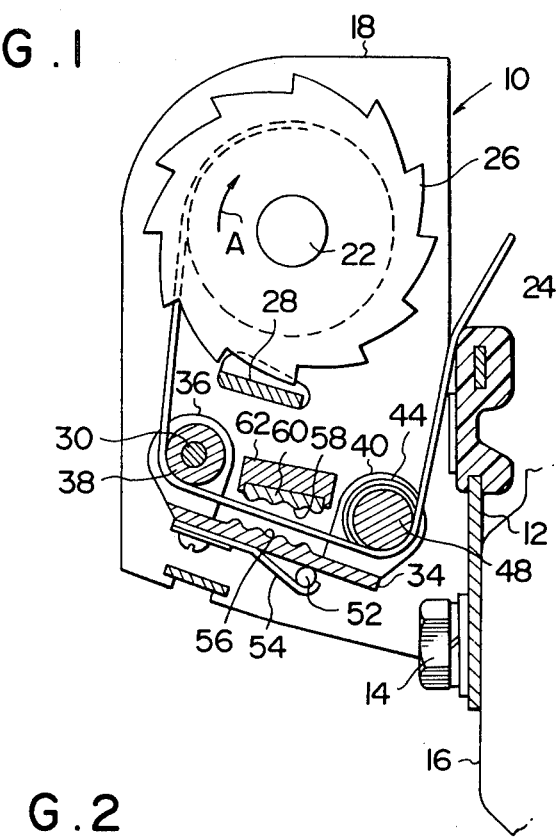
FIG. 1 is a sectional view showing a first embodiment of the webbing lock device according to the present invention.
Figure 2:
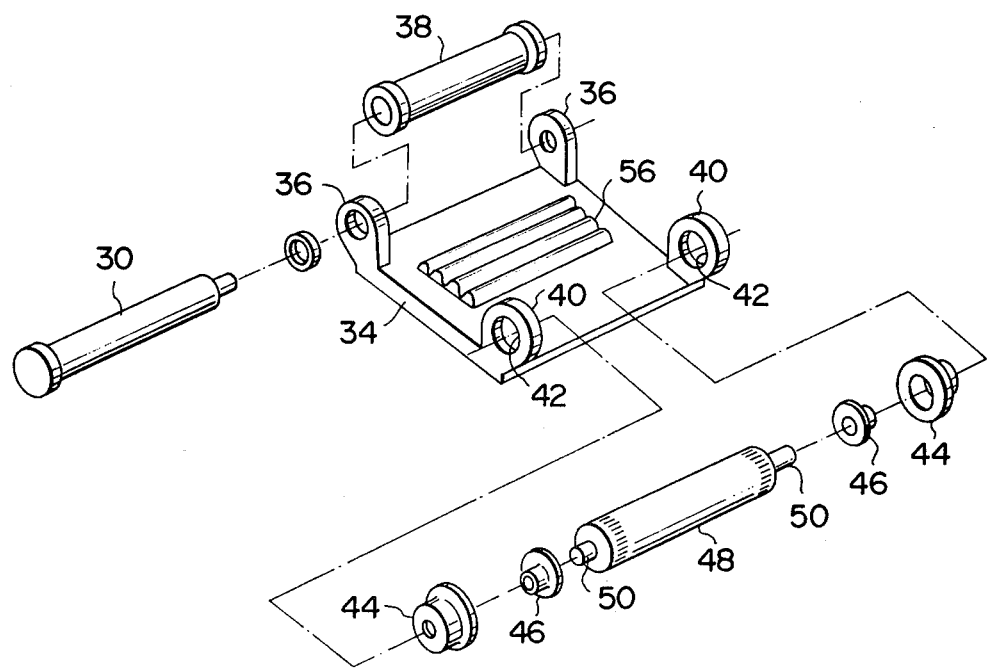
FIG. 2 is a disassembled perspective view showing the lock lever and the accessories thereof.

FIG. 1 shows a webbing retractor 10, into which is assembled a webbing lock device according to the present invention. This webbing retractor 10 is provided therein with a frame 12 and solidly secured to a vehicle 16 through a mounting bolt 14. A takeup shaft 22 is pivotally supported across a pair of leg plates 18 extending from opposite sides of the frame 12 in parallel to each other (However, in FIG. 1, one of the leg plates 18 is not shown). One end portion of the webbing 24 is wound in layers onto this takeup shaft 22, and urged in a direction of winding the webbing 24 (a direction indicated by an arrow A in FIG. 1) by an urging force of a spiral spring, not shown. The other portion, not shown, of this webbing 24 is drawn out of the retractor 10 to the outside and reaches the occupant restraining portion.

Solidly secured to the takeup shaft 22 are a pair of ratchet wheels 26 which are opposed to a pawl 28 tiltably supported by the parallel leg plates 18. This pawl 28 is actuated by an acceleration sensor, not shown, constituted by a pendulum or the like, when meshed with the ratchet wheels 26, the pawl 28 prevents the webbing unwinding rotations (in a direction opposite to the direction indicated by the arrow A) of the ratchet wheels 26 and the takeup shaft 22.

Provided at the lower portions of the parallel leg plates 18 is a support shaft 30, through which a lock lever or first clamping member 34 is journalled by a pair of bearing projections 36 thereof. Pivotally supported on the lock lever 34 between these bearing projections 36 is a roller 38.

A pair of bearing projections 40 project at positions adjacent the forward end portion of the lock lever 34 and these bearing projections 40 are penetratingly formed therein with round holes 42 coaxial with each other, respectively. Holders 44 are coupled into these round holes 42, respectively, and bushes 46 are inserted into the axes of these holders 44, respectively. Respectively journalled on these bushes 46 are small diameter shaft portions 50 formed at opposite ends of a roller 48, the outer configuration of which is slightly spaced apart from the inner peripheral surfaces of the holders 44, respectively. However, when this roller 48 is subjected to a heavy load in the radial direction, the small diameter shaft portions 50 are deformed to move in the radial direction, so that the outer peripheral surface of the small diameter shaft portions 50 contacts the inner peripheral surface of the holders 44 to receive a frictional resisting force.

Here, the rollers 38 and 48 constitute contact rods for the webbing 24 extending from the takeup shaft 22. Namely, the webbing 24 unwound from the takeup shaft 22 is partially wound around these rollers 38 and 48, and then, reaches the occupant restraining portion.

The lock lever 34 is provided thereon with a sheet spring 54 confined between a stopper 52 racked across the leg plates 18 and itself, and urged by an urging force of this sheet spring 54 in a direction of approaching the stopper 52 (a clockwise direction in FIG. 1).

Furthermore, a corrugated surface 56 is formed at the intermediate portion of the lock lever 34 in opposed relation to the intermediate portion of the webbing 24 between the two rollers 38 and 48, and adapted to clamp the intermediate portion of the webbing 24 with another corrugated surface 58 when the lock lever 34 rotates against the urging force of the sheet spring 54. This corrugated surface 58 is formed on the surface of a friction member or second clamping member 60 which is secured to a reinforcement member 62 racked across the leg plates 18.

Figure 3:
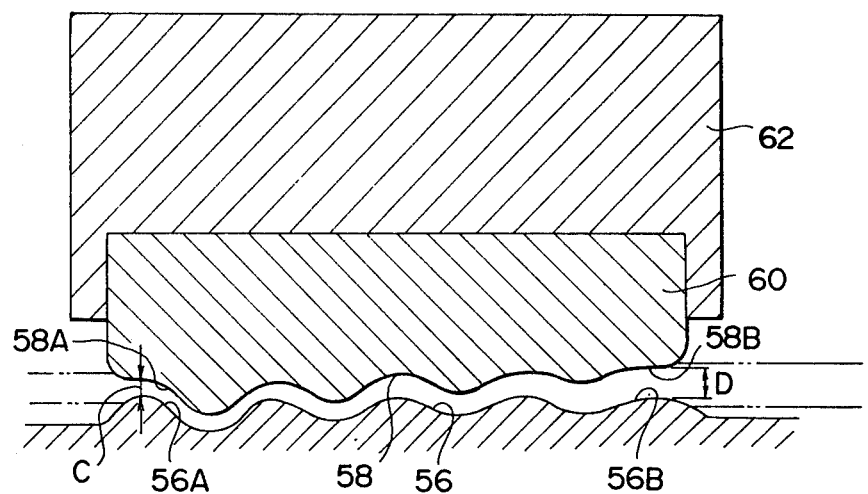
FIG. 3 is an enlarged view showing the locked state by the pair of corrugated surfaces.

Description will now be given of these corrugated surfaces 56 and 58 with reference to FIG. 3. FIG. 3 shows a state where the corrugated surfaces 56 and 58 clamp the intermediate portion of the webbing 24.

Here, the corrugated surfaces 56 and 58 each have convex portions and concave portions, radii of curvature of which progressively and continuously increases from one end 56A and 58A adjacent the takeup shaft (not shown) to the other end 56B and 58B adjacent the occupant (not shown). The interval between the corrugated surfaces 56 and 58 also progressively and continuously increases from the end 56A and 58A adjacent the takeup shaft (Dimension C) to the other end 56B and 58B adjacent the occupant (Dimension D). As a result, there is no partial abrupt increase or decrease in the interval of opposition at the intermediate portion of the webbing 24, i.e. the section where the webbing 24 is clamped.

In this embodiment with the above arrangement, the webbing 24 extending out of the takeup shaft 22 is guided by the rollers 38 and 48, and drawn out to the occupant restraining portion, where it is fastened about the occupant.

Here, during normal running situation of the vehicle, the occupant unwinds the webbing 24 of a required length, so that he can change his driving posture. In this case, the rollers 38 and 48 are supported by the small diameter shaft portion, so that the webbing 24 is moved under a very small frictional resistance due to a difference in diameter between the small diameter shaft portion and the webbing contact portion having a large diameter, thereby enabling to make the movement of the webbing very smooth in the cases of the webbing being fastened about the occupant, of a change in the driving posture during fastening about of the webbing and of a winding of the webbing after the webbing is unfastened.

Next, when the vehicle has fallen into the event of emergency situation such as a collision, an actuation of the acceleration sensor, not shown, causes the pawl 28 to be meshed with the ratchet wheels 26, whereby the webbing unwinding rotation of the takeup shaft is abruptly stopped.

While, the webbing 24 is subjected to an inertial force of collision of the occupant to increase in its tensile force, whereby this tensile force is imparted to the lock lever 34 via the roller 48, so that the lock lever 34 is rotated about the support shaft 30 in the counterclockwise direction in FIG. 1. This rotation causes the corrugated surface 56 of the lock lever 34 to approach the corrugated surface 58, so that the intermediate portion of the webbing 24 is clamped therebetween.

At the time of this clamping, since the interval of opposition between the corrugated surfaces progressively increases from the side of the takeup shaft to the side of the occupant restraining portion as shown in FIG. 3 in detail, the clamping force progressively increases from the side of the occupant restraining portion to the side of the takeup shaft, in proportion to which the tensile force progressively decreases, so that there is no point where the tensile force of the webbing abruptly decreases or increases. As a result, the webbing 24 is positively clamped by the corrugated surfaces 56 and 58, whereby the webbing 24 does not move toward the occupant restraining portion. A high tensile force does not act on the webbing 24 wound into the takeup shaft 22 because the intermediate portion thereof is directly locked, thereby preventing the problem of the prior art in that a considerable length of the webbing is unwound from the retractor until the webbing is tightly wound around the takeup shaft in layers.

Additionally, in this case, the roller 48 moves in a direction perpendicular to the shaft while deflecting the sheet spring 54 due to increased tensile force of the webbing 24, whereby the small diameter shaft portion 50 is deformed, so that the outer periphery of the roller 48 contacts the holders 44 to receive the rotational resistance. Consequently, the high tensile force acting on the portion of the webbing 24 between the roller 48 and the occupant restraining portion, not shown, decreases at the position of the roller 48, whereby a decreased tensile force acts on a portion of the webbing 24 between the rollers 48 and 38, with the result that a force for drawing out the webbing 24 from a space formed between the corrugated surfaces 56 and 58 decreases.

Figure 4:
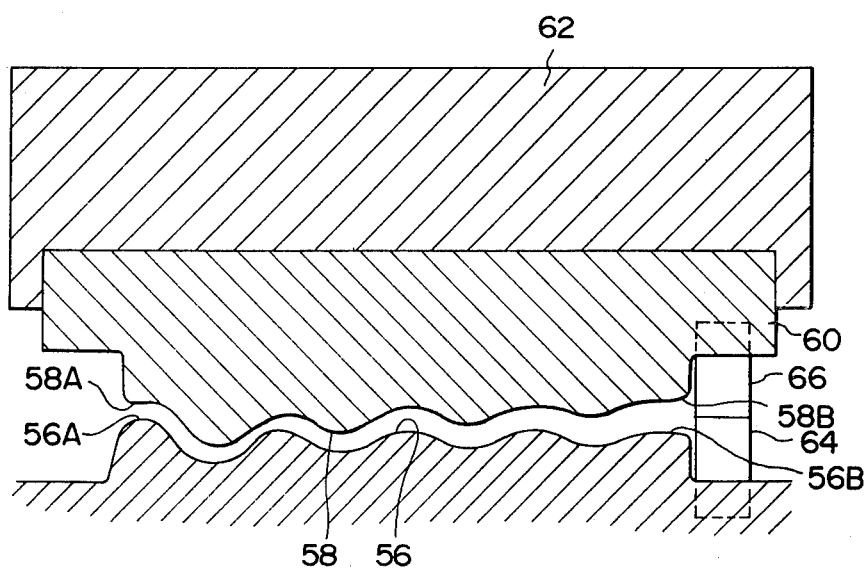
FIGS. 4 and 5 are enlarged sectional views showing a second and a third embodiments of the corrugated surfaces according to the present invention, respectively.

Next, FIG. 4 shows a second embodiment of the present invention. The curvatures of the corrugated surfaces 56 and 58 in this embodiment are similar to those in the preceding embodiment. The interval of opposition between the corrugated surfaces progressively increases from the side of the takeup shaft to the side of the occupant restraining portion in the same manner as in the preceding embodiment.

In this embodiment, a pair of stoppers 64 and 66 are respectively imbedded in the corrugated surfaces on the side of the occupant restraining portion. These stoppers 64 and 66 are adapted to abut against each other so as to prevent the interval of opposition between the pair of corrugated surfaces 56 and 58 from being less than a predetermined value. Consequently, in this embodiment, the corrugated surface 58 does not approach the corrugated surface 56 beyond necessity, so that the force for clamping the webbing is kept less than a predetermined value to prevent the webbing from being damaged.

Figure 5:
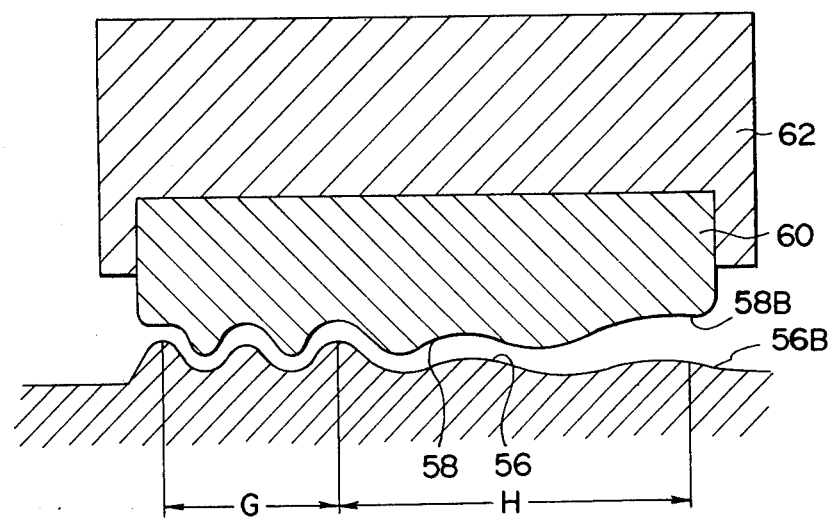

Further, FIG. 5 shows a third embodiment of the present invention. In this embodiment also, the interval of opposition between the corrugated surfaces increases from the side of the takeup shaft to the occupant restraining portion. However, the curvatures of the corrugated surfaces 56 and 58 are divided into two sections including a locking section G closer to the side of the takeup shaft and a tension attenuating section H closer to the occupant restraining portion. More specifically, it is designed such that the locking section G has a relatively small curvature of the corrugated surface and the tension attenuating section H has a relatively large curvature of the corrugated surface.

As a result, in this embodiment, during clamping of the webbing, the tension attenuating section H mainly functions in decreasing the tensile force of the webbing and the locking section G functions in reliably clamping the intermediate portion of the webbing so as to preclude the movement of the webbing.

In this embodiment also, the interval of opposition between the corrugated surfaces progressively increases from to the side of the takeup shaft toward the occupant, whereby there occurs no point where the tensile force of the webbing abruptly increases, so that the intermediate portion of the webbing is reliably locked.

As has been described hereinabove, in the webbing lock device according to the present invention, the interval of opposition between the pair of corrugated surfaces progressively increases from the side of the takeup shaft to the side of the occupant restraining portion, and hence, the webbing lock device according to the present invention is advantageous in that the tension in the intermediate portion of the webbing progressively decreases, no partial abrupt variation is caused to occur, so that the webbing is clamped by an appropriate force.

What we claim is:

1. A webbing lock device wherein an intermediate portion of an occupant restraining webbing extending from a take-up shaft is clamped between a pair of clamping members to prevent the webbing from moving, characterized in that each of said clamping members has a corrugated surface on opposed sides thereof, and an interval between said corrugated surfaces during webbing clamping which progressively increases from one end of said pair of clamping members adjacent the take-up shaft toward another end of said pair of clamping members adjacent an occupant along the longitudinal direction of the webbing, said corrugated surface having corrugations each with a radius of curvature wherein the radius of curvature of the corrugations of said corrugated surface progressively increase from said one end of said pair of clamping members toward said another end of said pair of clamping members along said longitudinal direction of the webbing.

2. A webbing lock device as set forth in claim 1, wherein concave portions of one of said corrugated surfaces are disposed to correspond to convex portions of the other of said corrugated surfaces.

3. A webbing lock device as set forth in claim 1, further comprising a stopper on at least one of said corrugated surfaces to prevent the interval between said corrugated surfaces from being less than a predetermined value.

4. A webbing lock device as set forth in claim 1 wherein said corrugated surfaces include a locking section closer to said one end, said locking section having corrugations with a relatively small radius of curvature, and a tension attenuating section closer to said another end, said tension attenuating section having corrugations with a relatively large radius of curvature.

5. A webbing lock device with locking an occupant restraining webbing extending from a take-up shaft of a retractor used in a seatbelt system for protecting an occupant in a vehicle, comprising:
 a first clamping member fixed on a wall of the retractor and having a first corrugated surface; and
 a second clamping member pivotally supported on the wall of the retractor and having a second corrugated surface opposed to said first corrugated surface, said second clamping member being movable to approach said first clamping member to clamp the webbing between said first and second corrugated surfaces, said corrugated surfaces having an interval therebetween during webbing clamping such that said interval progressively increases from one end of said clamping members adjacent the take-up shaft toward another end of said clamping members adjacent an occupant along the longitudinal direction of the webbing, each of said corrugated surfaces having corrugations with a radius of curvature which progressively increase from said one end of said pair of clamping members toward said another end of said pair of clamping members along the longitudinal direction of said webbing.

6. A webbing lock device as set forth in claim 5, wherein said second clamping member comprises at least one roller, around which the webbing is turned and through which said second clamping member is moved by the webbing to clamp the webbing when an abrupt tensile force acts on the webbing.

7. A webbing lock device as set forth in claim 6, wherein said second clamping member comprises a pair of rollers on opposite ends thereof in the longitudinal direction of the webbing.

8. A webbing lock device as set forth in claim 6 or 7, wherein said roller is deformable to cause a frictional resistance for rotation by an abrupt force acting on said roller whereby the webbing receives a frictional resisting force.

9. A webbing lock device for restraining an occupant against movement comprising:
 a take-up shaft;
 an occupant restraining webbing extending in a longitudinal direction and having a first end portion coupled to said take-up shaft, an intermediate portion, and a second end portion for restraining an occupant against movement;
 means for clamping the intermediate portion of said occupant restraining webbing and including first and second clamping members having corrugated surfaces positioned on opposite sides of said occupant restraining webbing for clamping said intermediate portion between said corrugated surfaces, said corrugated surfaces being spaced from one another during clamping such that the space between said corrugated surfaces increases from one end of said first and second clamping members adjacent said take-up shaft toward another end of said first and second clamping members adjacent said second end portion of said occupant restraining webbing along the longitudinal direction of said webbing, said corrugated surfaces having corrugations with a radius of curvature which progressively increase from said one end of said first and second clamping members to said another end of said first and second clamping members along said longitudinal direction.

10. In a vehicle seatbelt system having an occupant restraining webbing for protecting an occupant in a vehicle and including a first end portion, an intermediate portion, and a second end portion for restraining an occupant, a retractor having a take-up shaft coupled to said first end portion for winding said occupant restraining webbing, and a webbing lock device for clamping the intermediate portion of said webbing for restraining an occupant, the improvement in said webbing lock device comprising:

- a first stationary clamping member coupled to said retractor and having a first corrugated surface;
- a second movable clamping member pivotally coupled to said retractor and having a second corrugated surface positioned to oppose said first corrugated surface on opposite sides of the intermediate portion of said webbing; and
- means responsive to movement of said webbing for pivotally moving said second clamping member to clamp the intermediate portion of said webbing between the corrugated surfaces of said first and second clamping members, said first and second corrugated surfaces being spaced from one another during said clamping such that said space progressively increases in the longitudinal direction of said webbing from said first end portion of said webbing towards said second end portion of said webbing and each of said corrugated surfaces include cooperating corrugations, each having a radius of curvature such that the radius of curvature of the corrugations progressively increase in a direction from said first end portion of said webbing toward said second end portion of said webbing along said longitudinal direction.

11. In a vehicle restraining system including an occupant restraining webbing having a first end portion, an intermediate portion, and a second end portion for restraining an occupant in a vehicle, a retractor having a take-up shaft coupled to said one end portion of the webbing for retracting the webbing, and a webbing lock device for clamping the intermediate portion of said webbing and thereby prevent movement of said second end portion to restrain an occupant of a vehicle, the improvement in said webbing lock device comprising:

- a first clamping member positioned adjacent one side of said intermediate portion of the webbing, said first clamping member having a first corrugated surface including corrugations formed by alternating concave and convex surfaces extending adjacent said webbing in a longitudinal direction of said webbing;
- a second clamping member positioned adjacent another side of the intermediate portion of said webbing, said second clamping member including a second corrugated surface positioned in opposed relation to said first corrugated surface and having corrugations formed by alternating concave and convex surfaces extending in a longitudinal direction of said webbing, said first and second corrugated surfaces being positioned such that the concave surfaces of said first corrugated surface are in opposed relation to the convex surfaces of said second corrugated surface and the convex surfaces of said first corrugated surface are in opposed relation to the convex surfaces of said second corrugated surface;
- means for moving said first and and second clamping members with respect to one another to clamp said intermediate portion of said webbing between said first and second corrugated surfaces, said first and second corrugated surfaces being spaced during clamping such that said spacing progressively increases from the first end of said webbing toward the second end of said webbing in said longitudinal direction and each of said corrugations have a radius of curvature such that the radius of curvature of said corrugations progressively increase from said first end of said webbing towards the second end of said webbing in said longitudinal direction adjacent said intermediate portion of the webbing; and
- means for maintaining at least a predetermined spacing between said first and second corrugated surfaces during said clamping.

* * * * *